(12) United States Patent
Christie, IV

(10) Patent No.: US 7,957,326 B1
(45) Date of Patent: Jun. 7, 2011

(54) INTEGRATED HOME SERVICE NETWORK

(75) Inventor: Samuel H. Christie, IV, Cary, NC (US)

(73) Assignee: Nortel Networks Limited, Mississauga, Ontario (CA)

( * ) Notice: Subject to any disclaimer, the term of this patent is extended or adjusted under 35 U.S.C. 154(b) by 707 days.

(21) Appl. No.: 11/321,208

(22) Filed: Dec. 29, 2005

(51) Int. Cl.
    *H04L 12/28* (2006.01)
(52) U.S. Cl. .......................... 370/260; 370/401; 725/81
(58) Field of Classification Search .................. 709/228, 709/209, 227, 223; 455/419, 5.1, 411; 370/401, 370/260, 328, 352, 355; 341/176; 725/74, 725/81, 114
    See application file for complete search history.

(56) References Cited

U.S. PATENT DOCUMENTS

| | | | |
|---|---|---|---|
| 6,526,581 B1* | 2/2003 | Edson | 725/74 |
| 6,694,134 B1* | 2/2004 | Lu et al. | 455/419 |
| 7,024,461 B1* | 4/2006 | Janning et al. | 709/207 |
| 7,035,270 B2* | 4/2006 | Moore et al. | 370/401 |
| 7,155,305 B2* | 12/2006 | Hayes et al. | 700/224 |
| 7,237,029 B2* | 6/2007 | Hino et al. | 709/227 |
| 7,337,219 B1* | 2/2008 | Meenan et al. | 709/220 |
| 7,353,280 B2* | 4/2008 | Chiles et al. | 709/228 |
| 7,558,862 B1* | 7/2009 | Tyukasz et al. | 709/227 |
| 7,626,950 B2* | 12/2009 | Wright et al. | 370/260 |
| 7,630,328 B2* | 12/2009 | Wright et al. | 370/260 |
| 2005/0062637 A1* | 3/2005 | El Zabadani et al. | 341/176 |
| 2005/0097618 A1* | 5/2005 | Arling et al. | 725/114 |
| 2007/0107020 A1* | 5/2007 | Tavares | 725/81 |

* cited by examiner

*Primary Examiner* — William Trost
*Assistant Examiner* — Emmanuel Maglo
(74) *Attorney, Agent, or Firm* — Withrow & Terranova, PLLC

(57) ABSTRACT

The present invention provides a centralized home controller that is used to coordinate a plurality of associated packet communication clients. The home controller provides a centralized and unified control and messaging system for the various packet communication clients. The home controller also allows the packet communication clients to establish and control packet sessions among the associated packet communication clients, as well as between any one of the packet communication clients and remote clients. The packet communication clients are provided in consumer electronics devices, and the associated packet sessions support data, voice, audio, or video content. In one embodiment, the home controller acts as a proxy for the various communications between the packet communication clients.

22 Claims, 5 Drawing Sheets

INTEGRATED HOME SERVICE NETWORK

FIELD OF THE INVENTION

Figure 1:
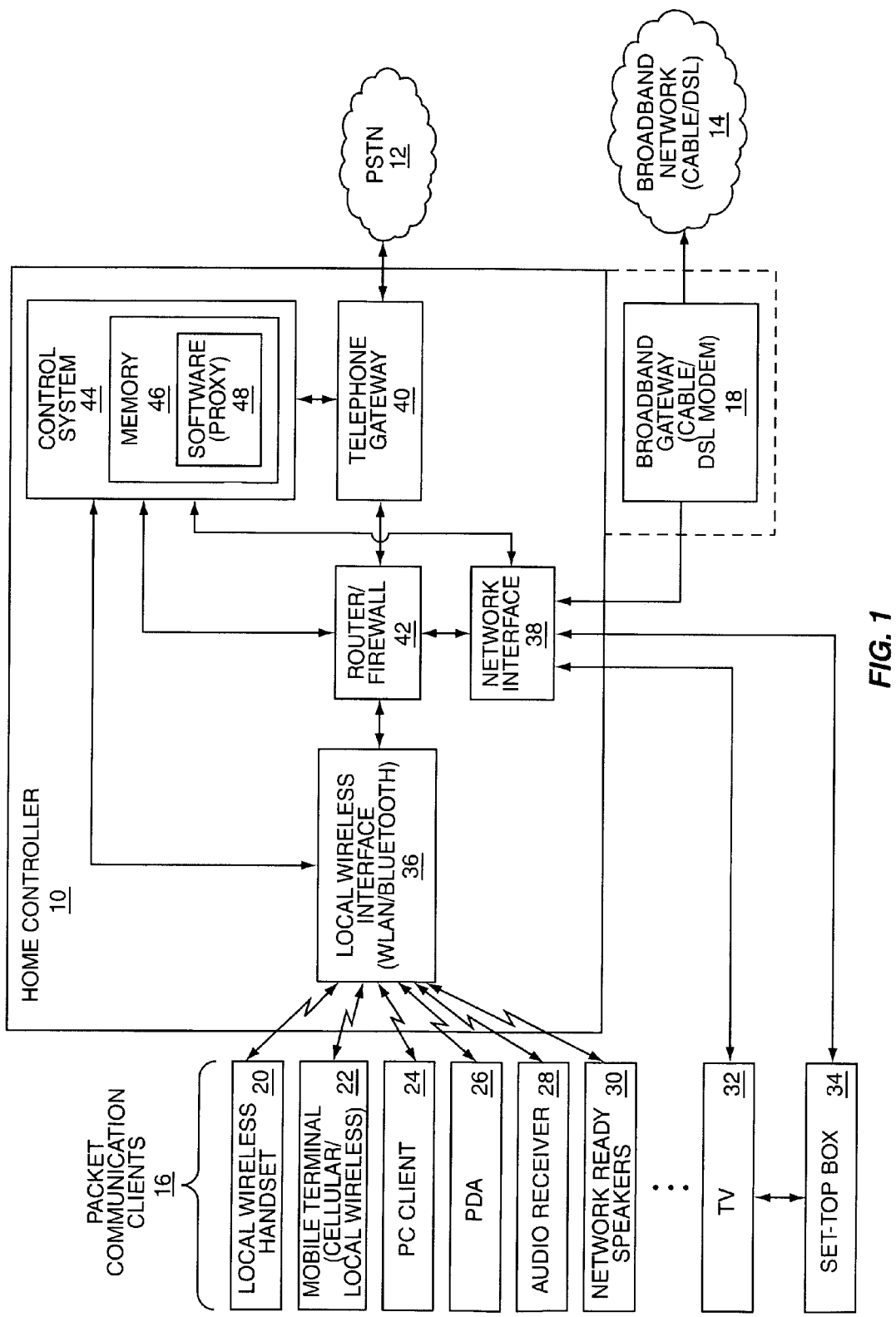

The present invention relates to networking residential consumer electronics devices, and in particular to providing integrated establishment and control of communication sessions with and between these consumer electronics devices.

BACKGROUND OF THE INVENTION

Traditionally, consumer electronics devices have used proprietary control and communication interfaces, which significantly impair the ability of these devices to interact with one another. With such proprietary interfaces, the devices that may interact with one another must be from a common manufacturer or provide a highly related function. For example, certain stereo or home theater electronics components may be connected to facilitate common control and operation. However, such control rarely extends to cable boxes, televisions, computers, or telephony devices.

Given the rapid acceptance of the Internet and packet-based communications and the corresponding convergence of various types of media, including audio, video, voice, and data, there is an ever-increasing desire to provide multimedia capabilities through various devices in an integrated fashion. Unfortunately, the lack of effective integration techniques and the use of proprietary control and communication interfaces continue to provide a barrier to fully exploiting multimedia capabilities.

To further complicate matters, many consumer electronics devices employ wireless interfaces that use a frequency spectrum used by other devices. For example, many cordless telephones operate in the unlicensed 2.4 GHz spectrum. Other wireless devices, such as wireless networking devices using wireless local area network protocols set forth in the IEEE's 802.11 standards, also operate in the 2.4 GHz spectrum. As such, these devices often compete for the allocated spectrum and interfere with one another. Further, the use of different protocols prohibits these devices from being able to interact with one another.

Although networking and telephony applications are the predominant wireless technologies in the home, there is a movement to deliver audio and video to various speakers, controllers, receivers, and monitors or televisions. In addition to wirelessly delivering the media, the need to provide various types of media for multimedia sessions from the various devices in a coordinated fashion will require concerted control over the respective devices. As such, there is a need for a way to provide an efficient and effective integration and control of the various consumer electronics devices in an efficient and effective manner.

SUMMARY OF THE INVENTION

The present invention provides a centralized home controller that is used to coordinate a plurality of associated packet communication clients. The home controller provides a centralized and unified control and messaging system for the various packet communication clients. The home controller also allows the packet communication clients to establish and control packet sessions among the associated packet communication clients, as well as between any one of the packet communication clients and remote clients. The packet communication clients are provided in consumer electronics devices, and the associated packet sessions support data, voice, audio, or video content. In one embodiment, the home controller acts as a proxy for the various communications between the packet communication clients.

The home controller may include various types of packet interfaces, including a local wireless interface for facilitating wireless communications with one or more of the packet communication clients, a wired interface for establishing ethernet or like connections with one or more of the packet communication devices, as well as an optional broadband interface for accessing a broadband network. The home controller may be integrated into one device or distributed over multiple devices. Further, a Public Switched Telephone Network (PSTN) interface may be provided, wherein the interface provides a gateway that will facilitate the necessary interworking between a traditional telephony line or other circuit-switched connection and the packet-based interworkings of the home controller. In one embodiment, one of the packet communication clients forms a handset for a cordless telephone, wherein the home controller acts like a base of a cordless telephone. As such, telephony calls over the PSTN and coming in through the PSTN interface are relayed to the packet communication client acting as a handset to facilitate telephony operation. In addition to establishing and controlling sessions between and with the various packet communication clients, basic control instructions may be provided to or from the packet communication clients to effectively control the operation of other packet communication clients.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of an integrated home service network environment according to one embodiment of the present invention.

Figure 2A:
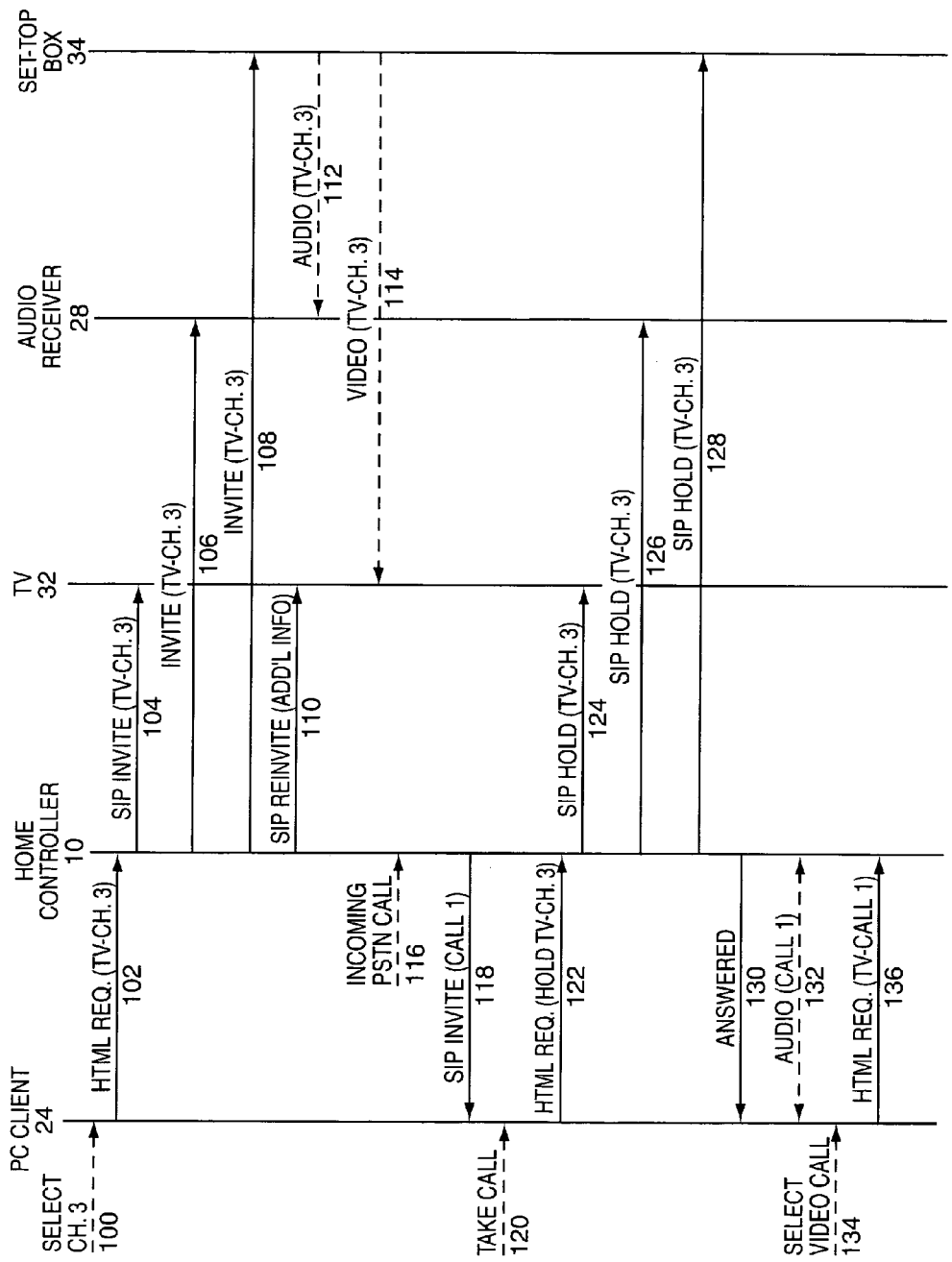
Figure 2B:
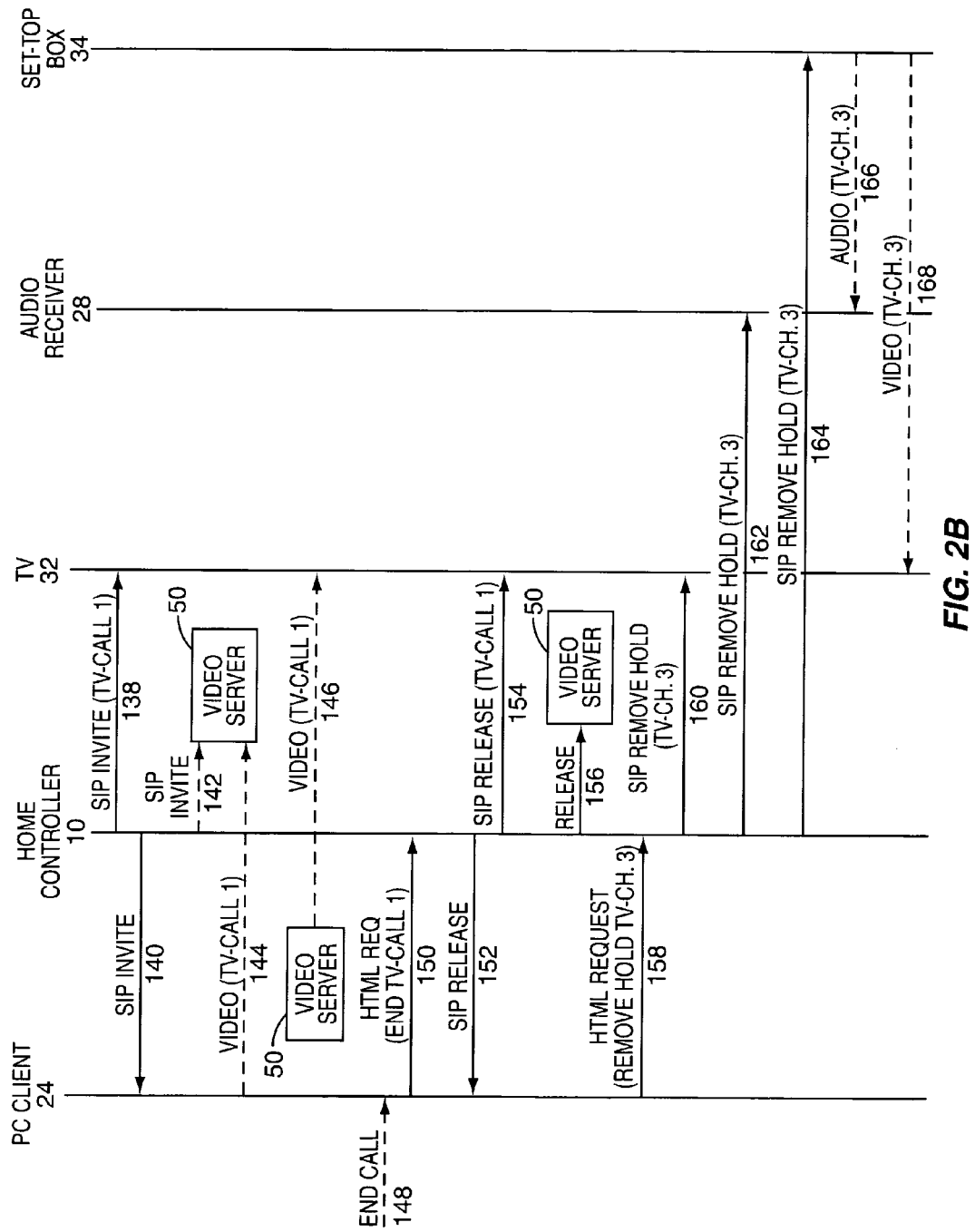

FIGS. 2A and 2B provide a communication flow diagram of an exemplary scenario of integrated home services network control via a home controller according to one embodiment of the present invention.

Figure 3A:
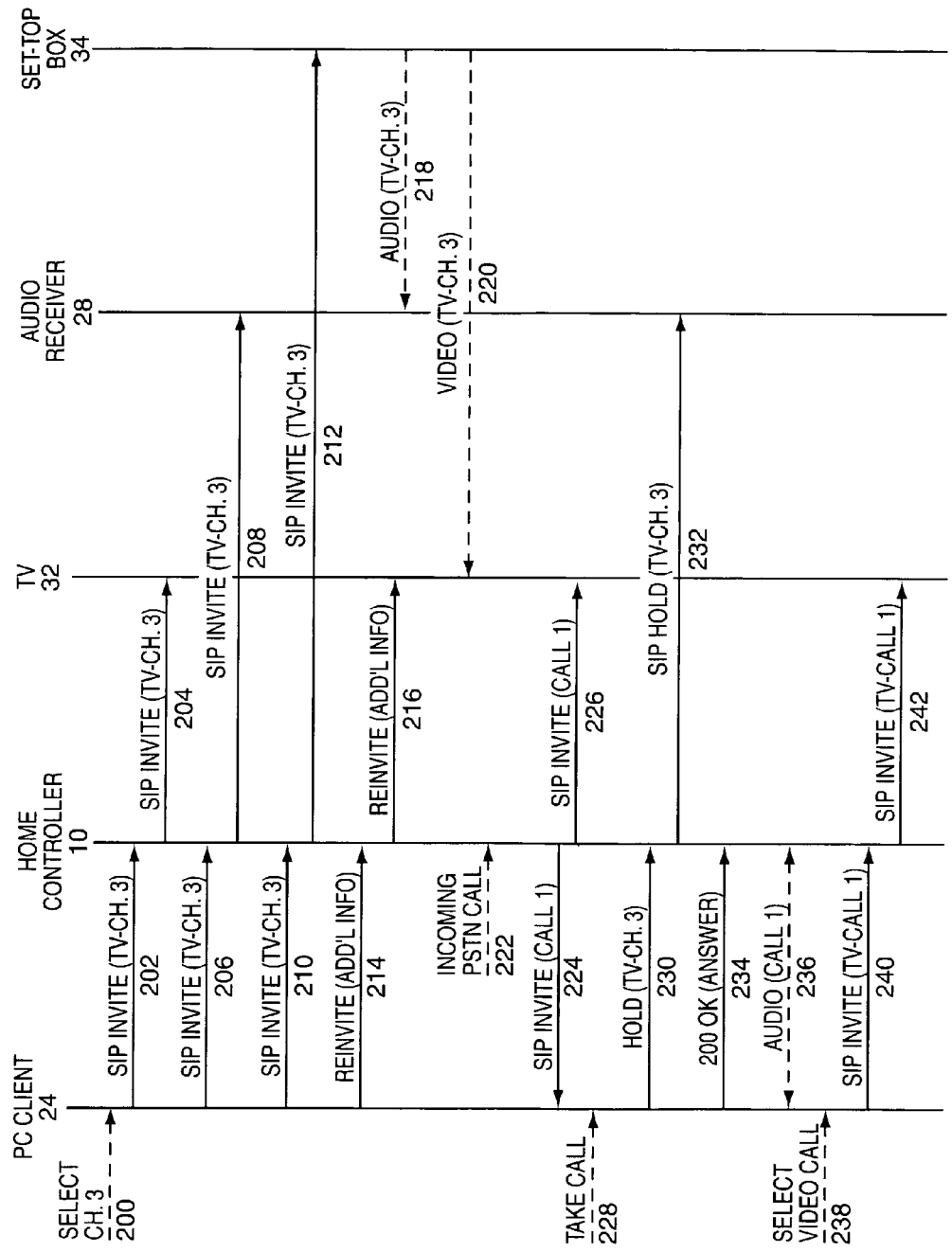
Figure 3B:
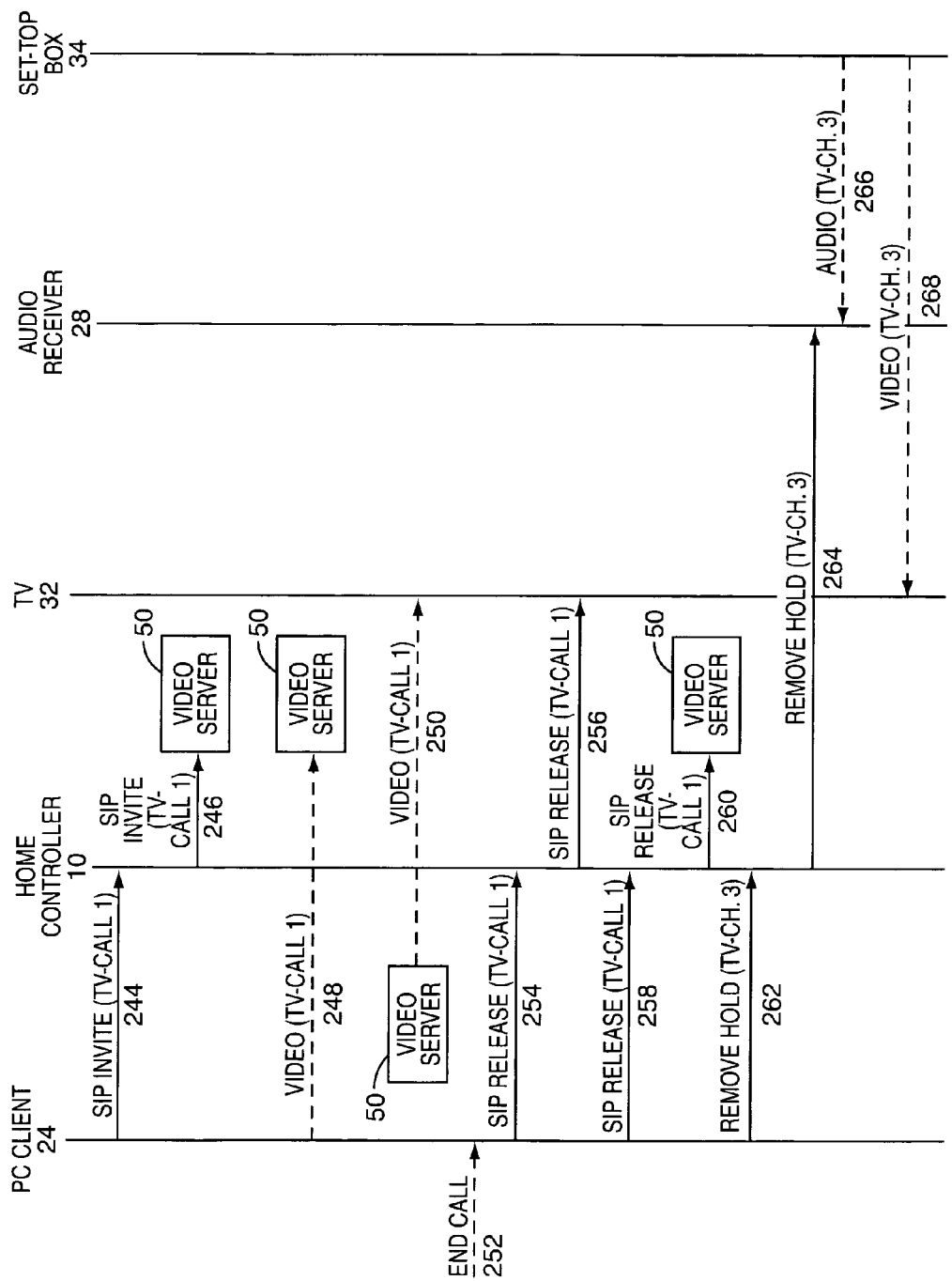

FIGS. 3A and 3B provide a communication flow diagram of an exemplary scenario of integrated home services network control via a home controller according to a second embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a centralized control point, referred to as a home controller, to facilitate the integration of multiple consumer electronics devices. These consumer electronics devices may include the requisite intelligence and associated interfaces to form packet communication clients capable of facilitating packet-based communications through wired or wireless means. As such, the home controller can facilitate a centralized and unified control and messaging system for the packet communication clients of the electronic devices. The home controller allows the packet communication clients to establish as well as control and manipulate packet sessions with any of the associated packet communication clients, as well as with remote clients. These sessions may be used to carry data, voice, audio, and video between any of the associated packet communication clients or between one or more of the associated packet communication clients and one or more remote devices. In one embodiment, the home controller acts as a proxy for the associated packet communication clients for establishing and controlling the packet sessions therebetween.

The home controller may include a Public Switched Telephone Network (PSTN) interface to support circuit-switched telephony including traditional telephone calls, as well as wired or wireless packet interfaces for communications with the associated packet communication clients and remote devices through broadband network connections. As such, the home controller may emulate a base station for a cordless telephone, wherein one or more of the electronic devices may act as a corresponding telephone handset. The home controller would be able to facilitate wireless communications with the handset to support telephony calls established over the PSTN or via the broadband interface.

Turning now to FIG. 1, an exemplary home controller 10 and associated environment is illustrated according to one embodiment. As illustrated, the home controller 10 will include or have access to multiple interfaces or gateways to support communications between the PSTN 12, or broadband network 14, such as that afforded by cable or digital subscriber line (DSL) services, and any number of packet communication clients 16. For access to the broadband network 14, the home controller 10 may include or be able to interact with a broadband gateway 18, such as a cable or DSL modem. The home controller 10 may interact with the packet communication clients 16 through wired or wireless techniques. The type of interface will vary depending on the type of device represented by the packet communication client 16. Exemplary packet communication clients 16 include a local wireless handset 20, such as that which would cooperate with the home controller 10 to provide a cordless telephone function; a mobile terminal 22, which may be able to carry out cellular as well as local wireless communications with the home controller 10; a PC client 24; a personal digital assistant (PDA) 26; an audio receiver 28; network ready speakers 30; a television (TV) or video display device 32; and a set-top box 34, just to name a few of the possible electronic devices represented by the packet communication clients 16.

Local wireless communications with the local wireless handset 20, mobile terminal 22, PC client 24, PDA 26, audio receiver 28, and network ready speakers 30 may be facilitated through a local wireless interface 36. The local wireless interface 36 may use any available wireless communication technology, such as Bluetooth or the IEEE's 802.11 standards for wireless local area networks (WLANs). For wired interfaces, the home controller 10 may include a network interface 38, which may be ethernet-based, and is shown as being connected to the television 32 and the set-top box 34, which may be connected to each other directly or indirectly through the network interface 38. Such inter-client connections are possible with any of the packet communication clients 16.

The PSTN interface may include a telephone gateway 40, which will take the necessary steps to convert between packet and circuit switched communications. The local wireless interface 36, network interface 38, and telephone gateway 40 are coupled to each other through an appropriate router 42, which may include a firewall, between the home controller 10 and the broadband network 14. As such, the router 42 may operate to direct packets in either direction between the local wireless interface 36, network interface 38, and telephone gateway 40 as necessary to facilitate communication sessions between the various packet communication clients 16 as well as remote devices on the PSTN 12 or on the broadband network 14.

The home controller 10 will include a control system 44 operatively coupled to the router 42 and perhaps to the respective interfaces 36, 38, 40. One role of the control system 44 is to provide a communication proxy for the respective packet communication clients 16. The control system 44 will be associated with sufficient memory 46, which will include the necessary software 48 to provide the operation described herein.

As noted above, the home controller 10 is capable of interacting with the various packet communication clients 16 to receive instructions for establishing sessions between two or more of the packet communication clients 16 or remote devices, and take the necessary steps to establish those sessions as instructed. In one embodiment, the communication proxy provided by the control system 44 will interact with the various packet communication clients 16 and establish sessions as dictated by any one or more of the packet communication clients 16. Notably, for a given multimedia session, different sessions may be established among different packet communication clients 16. For example, a television session including audio and video may require a video session established between the television 32 and the set-top box 34 for delivery of video from the set-top box 34 to the television 32, as well as an audio session between the set-top box 34 and an audio receiver 28 for delivery of audio from the set-top box 34 to the audio receiver 28. Alternatively, an audio session may be established to the network ready speakers 30, which are capable of receiving streaming audio and playing the audio without the audio receiver 28 acting as a liaison. In yet another alternative, the audio streamed to the audio receiver 28 from the set-top box 34 may be further forwarded to the network ready speakers 30, for example a left channel to one speaker and a right channel to another, from the audio receiver 28. The home controller 10 may interact with each of these packet communication clients 16 to establish the requisite sessions, provide the necessary control to have the proper content delivered to these packet communication clients 16, and receive instructions from any of these packet communication clients 16 or other packet communication clients 16 to control one or more of the established sessions.

Given the integration provided by the home controller 10, additional functionality may be implemented in the home controller 10. For example, the home controller 10 may establish sessions with the respective packet communication clients 16 or remote devices, and store received data, audio, video, or voice and then establish subsequent sessions with any of the packet communication clients 16 to essentially replay or otherwise provide the stored information. As such, the home controller 10 may operate as an answering machine, digital video recorder, or the like. For email applications, the home controller 10 may act as a Simple Mail Transfer Protocol (SMTP) host to control mail delivery among the packet communication clients 16 and remote devices. Further, the wireless nature of the local wireless interface 36 and the ability to interact with the packet communication clients 16 essentially allows any of the packet communication clients 16 to act as remote controllers for any of the other packet communication clients 16 as well as for the home controller 10.

Turning now to FIGS. 2A and 2B, an exemplary scenario is provided to illustrate the concepts of the present invention. As illustrated, the PC client 24 is used to establish a television session so that the user may watch channel 3 on the television 32 and receive the corresponding audio via the audio receiver 28, which is connected to traditional stereo or home theater speakers. Once the television sessions are established, the user may receive an incoming call through the PSTN 12, which will automatically trigger the home controller 10 to alert the PC client 24. For this example, the incoming call is answered by the user through the PC client 24, which is presumably equipped with the appropriate microphone, speakers, and the necessary hardware and software to facilitate telephony communications. The PC client 24 may be a notebook computer often used while viewing the television 32. Once the call is established, the user will elect to initiate a video conference, which will be established under the control of the home controller 10 in response to a request from the PC client 24. After the video conference ends, viewing of the television session will resume. FIGS. 2A and 2B illustrate a communication flow using pseudo messaging for illustration purposes. Assume that the home controller 10 provides a primary control function, supports user interactions via a hypertext markup language (HTML), and controls sessions using the Session Initiation Protocol (SIP).

Initially, assume the user selects channel 3 through a television interface afforded by the PC client 24 (step 100), which will respond by sending an HTML request to request establishment a television session for channel 3 to the home controller 10 (step 102). Assume that the HTML request includes information directing the home controller 10 to establish the video session for the television session from the set-top box 34 to the television 32, and the audio session from the set-top box 34 to the audio receiver 28. As such, the home controller 10 will process the HTML request from the PC client 24 and send SIP Invite messages to the television 32, audio receiver 28, and set-top box 34 (steps 104, 106, and 108) to establish the audio and video sessions. In select embodiments, the home controller 10 may send a follow-up Invite message, or Re-invite, to provide additional information for controlling the television 32 (step 110 as shown), audio receiver 28, or set-top box 34. The additional information may dictate volume, channel guide information, or the like. At this point, an audio session is established from the set-top box 34 to the audio receiver 28 (step 112), and a video session is established from the set-top box 34 to the television 32 (step 114). The audio and video for the sessions correspond to channel 3 content.

Assume that during viewing of the television program on channel 3, a call is received via the PSTN 12 at the home controller 10 (step 116). The home controller 10 may be configured through various processing rules to handle the numerous events it may encounter as a centralized controller, and will send a SIP Invite message to the PC client 24 indicating that an incoming call (CALL 1) is being received (step 118). The PC client 24 may receive user input indicative of the user taking the call at the PC client (step 120).

The PC client 24 may be configured to automatically respond to the SIP Invite message and the user taking the call by providing an HTML request instructing the home controller 10 to hold the television session (step 122). In response, the home controller 10 will recognize that hold messages must be sent to the television 32, audio receiver 28, and set-top box 34, and will send hold messages (SIP) to each of these packet communication clients 16 (steps 124, 126, and 128). The PC client 24 will take the necessary steps to answer the incoming call and send a message to the home controller 10 indicating that CALL 1 was answered (step 130). At this point, the PC client 24 and home controller 10 will establish a bi-directional audio session for the incoming call (CALL 1) (step 132). Notably, the audio session is a packet session between the PC client 24 and the home controller 10, and in particular with the telephone gateway 40, which provides a circuit-switched connection to the PSTN 12 for the incoming call. As such, bi-directional voice communications are established between the PC client 24 and the calling party through the home controller 10 and the PSTN 12. The packet session between the PC client 24 and home controller 10 may go through the local wireless interface 36, as illustrated in FIG. 1.

Assume that once the call is established, the user recognizes that the call could be a video call, and selects a video call at the PC client 24 (step 134), which will send an HTML request to the home controller 10 to establish the video call (TV-CALL 1) (step 136). Either the HTML request will include information identifying the television 32 for the video session of the video call, or the home controller 10 will make the decision to elect the television 32 for the video session of the video call. The home controller 10 may send SIP Invite messages to the television 32, the PC client 24, and video server 50 to initiate the video sessions for each direction of the video call (TV-CALL 1) (steps 138, 140, and 142).

Assuming that the PC client 24 has a camera and the requisite hardware or software to deliver video images, a video session may be established from the PC client 24 to the video server 50 through the home controller 10 (step 144). Similarly, incoming video may be received over appropriate sessions from the video server 50 and sent to the television 32 (step 146). Notably, the sessions may be direct sessions between the video server 50 and the PC client 24 or television 32, or separate sessions between the home controller 10 and the respective devices. In either case, incoming video is delivered to the television 32 from the video server 50, and outgoing video is delivered from the camera on the PC client 24 to the video server 50. The video server 50 may support similar sessions with the calling party's device or devices. Alternatively, the sessions may be established between the respective audio and video devices of the parties under control of the home controller 10.

Next, assume the user ends the video call through the PC client 24 (step 148), which will send an HTML request to release or otherwise end the call (TV-CALL 1) to the home controller 10 (step 150). The home controller 10 will send a SIP release message to the PC client 24, television 32, and video server 50 (steps 152, 154, and 156). At this point, the audio and video sessions of the call are ended. Since the call is ended, the PC client 24 may use an HTML request to instruct the home controller 10 to remove the hold placed on the multimedia session for the television session (step 158). In response, the home controller 10 will send SIP Remove Hold messages to the television 32, audio receiver 28, and set-top box 34 (steps 160, 162, and 164) to reestablish streaming of the audio and video over the respective audio and video sessions (steps 166 and 168).

Another embodiment provides a distributed control component by incorporating additional control capability in a SIP client on the PC client 24. The home controller 10 may act as a SIP proxy and will operate to control session signaling between the various packet communication clients 16. A communication flow for such an embodiment to implement a similar scenario described above is provided in FIGS. 3A and 3B.

Again, assume the user selects channel 3 through a television interface afforded by the PC client 24 (step 200), which will respond by sending SIP Invite messages intended for each of the television 32, audio receiver 28, and set-top box 34 to establish a television session for channel 3. The SIP Invite messages are received by the home controller 10 (steps 202, 206, 210), which sends the SIP Invite messages to the television 32, audio receiver 28, and set-top box 34 (steps 204, 208, and 212). The SIP Invite messages include information to establish the video session for the television session from the set-top box 34 to the television 32, and the audio session from the set-top box 34 to the audio receiver 28. In select embodiments, the PC client 24 may send a follow-up SIP Invite message, or Re-invite, to the television 32 via the home controller 10 to provide additional information for controlling the television 32 (steps 214 and 216), audio receiver 28, or set-top box 34. The additional information may dictate volume, channel guide information, or the like. At this point, an audio session is established from the set-top box 34 to the audio receiver 28 (step 218), and a video session is established from the set-top box 34 to the television 32 (step 220). The audio and video for the sessions correspond to channel 3 content.

Assume that during viewing of the television program on channel 3, a call is received via the PSTN 12 at the home controller 10 (step 222). The home controller 10 may be configured through various processing rules to handle the numerous events, and will send a SIP Invite message to the PC client 24 indicating that an incoming call (CALL 1) is being received (step 224). Upon receiving user input to take the call (step 228), the PC client 24 may be configured to automatically respond to the SIP Invite message for an incoming PSTN call by instructing the home controller 10 to hold just the audio portion of the television session (step 230). In response, the home controller 10 will recognize that a hold message (SIP) must be sent to the audio receiver 28, but not the television 32 or the set-top box 34, and will send a hold message to the audio receiver 28 (step 232). When the PC client 24 answers the call, a 200 OK message is sent to the home controller 10 (step 234). At this point, the PC client 24 and home controller 10 will establish a bi-directional audio session for the incoming call (CALL 1) (step 236). Notably, the audio session is a packet session between the PC client 24 and the home controller 10, and in particular with the telephone gateway 40, which provides a circuit-switched connection to the PSTN 12 for the incoming call. As such, bi-directional voice communications are established between the PC client 24 and the calling party through the home controller 10 and the PSTN 12. The packet session between the PC client 24 and home controller 10 may go through the local wireless interface 36 as illustrated in FIG. 1.

Again assume that once the call is established, the user recognizes that the call could be a video call, and selects a video call at the PC client 24 (step 238), which will send a SIP Invite message to the home controller 10 to establish the video call (TV-CALL 1) (step 240). The home controller 10 will send the SIP Invite to the television 32 for the video call (step 242). Similarly, the PC client 24 will also send a SIP Invite message to a video server 50 or other device associated with the call via the video server 50 over the broadband network 14 (steps 244 and 246) to establish a video session with the video server 50. Assume that the PC client 24 has a camera and the requisite hardware or software to deliver video images. At this point, a video session may be established from the PC client 24 to the video server 50 through the home controller 10 (step 248). Incoming video may be received over appropriate sessions from the video server 50 and sent to the television 32 (step 250). Notably, the sessions may be direct sessions between the video server 50 and the PC client 24 or television 32, or separate sessions between the home controller 10 and the respective devices. In either case, incoming video is delivered to the television 32 from the video server 50, and outgoing video is delivered from the camera on the PC client 24 to the video server 50. The video server 50 may support similar sessions with the calling party's device or devices. Alternatively, the sessions may be established between the respective audio and video devices of the parties under control of the home controller 10.

Next, assume the user ends the video call through the PC client 24 (step 252), which will send a SIP release message (BYE) for the call to the home controller 10 (step 254), which will send the SIP release message to the television 32 (step 256). The PC client will send a SIP release message to the video server 50 via the home controller 10 (steps 258 and 260). At this point, the audio and video sessions of the call are ended. Since the call is ended, the PC client 24 may instruct the home controller 10 to remove the hold placed on the multimedia session for the television session (step 262). The home controller 10 will send an appropriate message via to the audio receiver 28 to remove the hold on the audio for the television session and reestablish streaming of the audio over the audio session (step 264).

Although the above illustrates only a couple of numerous possible scenarios, those skilled in the art will recognize the ability of any one of the packet communication clients 16 to interact with the home controller 10 and establish and control sessions with other of the associated packet communication clients 16, as well as with remote devices. Those skilled in the art will also recognize the tremendous flexibility and efficiency provided by using the home controller 10 as a base station for a cordless telephone, which has a local wireless handset 20 acting as one of the packet communication clients 16. Providing the home controller functionality in the base station of a cordless telephone centralizes control in a very commonly desired entity in a residence. Further, the optional functionality of a PSTN interface allows the home controller 10 to be the centralized communication hub for the entire home. As such, data, audio, video, and voice communications may be established with any number of the packet communication clients 16 as desired by the user. Internet access may be afforded to any of these devices in addition to the audio, video, and voice capabilities. Those skilled in the art will recognize the limitless types of functionality afforded by such a centralized system. Those skilled in the art will also recognize that the session control messages forming the request could also be web-based or Internet-based pushes using Internet Protocol techniques. As such, the packet communication clients 16 as well as the home controller 10 may act as a client or a server, depending on the configuration and the direction in which requests and responses are required. These requests and responses may establish the various control instructions as well as be used to establish sessions for any type of data, audio, video, or voice sessions.

Those skilled in the art will recognize improvements and modifications to the preferred embodiments of the present invention. All such improvements and modifications are considered within the scope of the concepts disclosed herein and the claims that follow.

What is claimed is:
1. A home controller comprising:
  at least one packet communications interface adapted to facilitate packet communications with a plurality of associated packet communication clients provided by a plurality of consumer electronics devices associated with a residence; and a control system associated with the at least one packet communications interface and adapted to:

receive an instruction from a first of the plurality of associated packet communication clients via the at least one packet communications interface to establish or control a media session between a second of the plurality of associated packet communication clients and a third of the plurality of associated packet communication clients; and establish or control the media session between the second of the plurality of associated packet communication clients and the third of the plurality of associated packet communication clients according to the instruction.

2. The home controller of claim 1 wherein the control system is further adapted to establish or control a second media session with the second of the plurality of associated packet communication clients according to the instruction.

3. The home controller of claim 1 wherein the control system is further adapted to establish or control a second media session with the third of the plurality of associated packet communication clients according to the instruction.

4. The home controller of claim 1 wherein the control system is further adapted to communicate with the associated packet communication clients using a uniform message protocol.

5. The home controller of claim 1 wherein one of the associated packet communication clients is adapted to emulate a handset for a cordless telephone and further comprising a public switched telephone interface cooperating with the control system and the at least one packet communications interface to emulate a base station for the cordless telephone, such that telephony communications are provided with the one of the associated packet communication clients, the public switched telephone interface adapted to provide a gateway to facilitate interworking between the at least one packet communications interface and a public switched telephone network.

6. The home controller of claim 1 wherein the at least one packet communications interface comprises a local wireless interface adapted to facilitate wireless communications with at least certain of the associated packet communication clients.

7. The home controller of claim 1 wherein the at least one packet communications interface comprises a wired interface adapted to facilitate wired communications with at least certain of the associated packet communication clients.

8. The home controller of claim 1 wherein the media session is at least one of a group consisting of data, audio, video, and voice.

9. The home controller of claim 1 wherein the control system is further adapted to interact with the first of the plurality of associated packet communication clients to receive control commands for the second of the plurality of associated packet communication clients and send instructions to control the second of the plurality of associated packet communication clients based on the control commands.

10. The home controller of claim 1 wherein the control system further comprises memory for storing information received from at least one of the plurality of associated packet communication clients and is further adapted to deliver the information from the memory to at least one of the plurality of associated packet communication clients.

11. The home controller of claim 1 wherein the control system is further adapted to communicate with at least one of the associated packet communication clients using different message protocols.

12. The home controller of claim 3 wherein the media session and the second media session form part of a single multimedia session.

13. The home controller of claim 4 wherein the control system is further adapted to function as a proxy for communications involving the associated packet communication clients.

14. The home controller of claim 7 wherein the at least one packet communications interface further comprises a local wireless interface adapted to facilitate wireless communications with others of the associated packet communication clients.

15. The home controller of claim 1 wherein the control system is further adapted to provide a simple mail transfer protocol host for handling email associated with at least one of the associated packet communication clients.

16. The home controller of claim 10 wherein the information includes video content and associated audio content.

17. The home controller of claim 14 wherein one of the associated packet communication clients is adapted to emulate a handset for a cordless telephone and further comprising a public switched telephone interface cooperating with the control system and the at least one packet communications interface to emulate a base station for the cordless telephone, such that telephony communications are provided with the one of the associated packet communication clients, the public switched telephone interface adapted to provide a gateway to facilitate interworking between the at least one packet communications interface and a public switched telephone network.

18. The home controller of claim 17 further comprising a router associated with the wired interface, the local wireless interface, and the public switched telephone interface and adapted to facilitate communications between the wired interface, the local wireless interface, and the public switched telephone interface.

19. The home controller of claim 18 further comprising a broadband interface associated with the router.

20. The home controller of claim 19 further comprising a firewall associated with the router and the broadband interface.

21. A method for integrating consumer electronics devices comprising:

receiving, at a home controller, an instruction from a first of a plurality of associated packet communication clients via at least one packet communications interface to establish or control a media session between a second of the plurality of associated packet communication clients and a third of the plurality of associated packet communication clients, the plurality of associated packet communication clients provided by a plurality of consumer electronics devices associated with a residence; and establishing or controlling the media session between the second of the plurality of associated packet communication clients and the third of the plurality of the associated packet communication clients according to the instruction.

22. A home controller comprising:

at least one packet communications interface adapted to facilitate packet communications with a plurality of associated packet communication clients provided by a plurality of consumer electronics devices associated with a residence; and a control system associated with the at least one packet communications interface and adapted to:

receive an instruction via the at least one packet communications interface from a first of the plurality of associated packet communication clients to establish or control a media session between a second of the plurality of associated packet communication clients and a third of the plurality of associated packet communication clients, wherein the first of the plurality of associated packet communication clients is adapted to emulate a handset for a cordless telephone; and establish or control the media session between the second of the plurality of associated packet communication clients and the third of the plurality of associated packet communication clients according to the instruction; and a public switched telephone interface cooperating with the control system and the at least one packet communications interface to emulate a base station for the cordless telephone, such that telephony communications are provided with the first of the plurality of packet communication clients, the public switched telephone interface adapted to provide a gateway to facilitate interworking between the at least one packet communications interface and a public switched telephone network.

* * * * *